(12) United States Patent
Miyasaka

(10) Patent No.: US 7,652,860 B2
(45) Date of Patent: Jan. 26, 2010

(54) POLYMER PTC DEVICE

(76) Inventor: Naofumi Miyasaka, Tyco Electronics Raychem K.K., Tsukuba Plant, 2414 Amata Inashiki-shii, Ibaraki (JP) 300-0626

( * ) Notice: Subject to any disclaimer, the term of this patent is extended or adjusted under 35 U.S.C. 154(b) by 235 days.

(21) Appl. No.: 10/548,550

(22) PCT Filed: Mar. 4, 2004

(86) PCT No.: PCT/JP2004/002723

§ 371 (c)(1),
(2), (4) Date: Jul. 3, 2006

(87) PCT Pub. No.: WO2004/079852

PCT Pub. Date: Sep. 16, 2004

(65) Prior Publication Data

US 2007/0090809 A1    Apr. 26, 2007

(30) Foreign Application Priority Data

Mar. 7, 2003    (JP)    ............................. 2003-062138

(51) Int. Cl.
*H02H 9/00*    (2006.01)
(52) U.S. Cl. ...................................... 361/91.1; 361/106
(58) Field of Classification Search ................ 361/91.1, 361/106
See application file for complete search history.

(56) References Cited

U.S. PATENT DOCUMENTS

| 6,653,018 | B2 * | 11/2003 | Takahashi et al. | ........... 429/185 |
| 6,862,164 | B2 * | 3/2005 | Hasunuma et al. | .......... 361/106 |
| 6,936,374 | B2 * | 8/2005 | Ehara | .......................... 429/90 |

FOREIGN PATENT DOCUMENTS

| JP | 6-349480 | 12/1994 |
| JP | 10-149906 | 6/1998 |
| JP | 2001-052903 A | 2/2001 |
| JP | 2001-216883 A | 8/2001 |
| JP | 2001-313202 A | 11/2001 |
| JP | 2002-150918 A | 5/2002 |
| WO | WO 98/12716 | 3/1998 |

OTHER PUBLICATIONS

International Search Report for International Application No. PCT/JP2004/002723, completed May 31, 2004.
European Search Report for European application No. 04717305.9, mailed Sep. 9, 2008.

* cited by examiner

*Primary Examiner*—Stephen W Jackson

(57) ABSTRACT

An overvoltage protection device is adopted, which is provided with a conductive polymer that runs away thermally when the resistance value becomes $V^2/P$ or higher, given that the power consumption when actuated is P and the voltage of the secondary battery cell when fully charged is V.

3 Claims, 2 Drawing Sheets

POLYMER PTC DEVICE

TECHNICAL FIELD

This invention relates to a PTC device that is in particular a polymeric PTC device, an overvoltage protection device, and an electronic apparatus. Priority is claimed from Japanese Patent Application No. 2003-62138, the content of which is incorporated herein by reference.

BACKGROUND ART OF THE INVENTION

Various portable electronic apparatus, such as cellphones, digital cameras, video cameras, and notebook computers and the like, use as the power source a secondary battery that can be used repeatedly through charging. Because of the requirements of small size and long hours of use, lithium ion batteries, having a high energy density, are widely used as such secondary battery. However, because lithium ion batteries have a risk of decreased battery performance or failure when overcharged, an overcharge needs to be prevented when charging.

Thus, in Japanese Unexamined Patent Application, First Publication 2001-313202, a protection device is disclosed to protect a lithium ion secondary battery when an overcharge occurs. That is, a PTC device and a fuse (low melting point metal) are provided in the charge circuit in this protection device so that when the lithium ion secondary battery is in an overcharged state, the resistance value of the PTC device increases to suppress the charge current to the lithium ion secondary battery. Further, in this protection device, when the temperature of the PTC device becomes excessive owing to heat being stored through repeated actuation of the PTC device, the above fuse is fused to cut off charge current to the lithium ion battery.

For example, a protection element is disclosed in Japanese Unexamined Patent Application, First Publication 2002-150918, wherein a PTC device is connected sandwiched between a pair of external connection terminals, with either of the external connection terminals having a fuse function. Further, in this protection element, the above fuse function is set to operate when the temperature condition reaches a temperature higher than the actuating temperature of the PTC device.

In the above protection device and protection element, after the PTC device is actuated by heat generated by a battery through being overcharged, the overcharged battery must generate more heat in order for the low melting point metal to operate. In order to remedy this, a means may be considered of making the low melting point metal operate immediately by adopting a low melting point metal with a lower melting point. However, this would cause the low melting point metal to fuse simply because the ambient temperature rose through natural use and therefore cannot be offered for practical use.

This invention was made in view of the above circumstances and has the purpose of providing a means of preventing a secondary battery from failure or decreased performance caused by overvoltage on the secondary battery during charging.

DISCLOSURE OF INVENTION

In order to solve the above problem, the following means is adopted. To wit, the PTC device of the present invention is characterized by thermally running away when the resistance becomes $V^2/P$ or higher, given the power consumption when in operation is P and the voltage at which the above secondary battery is fully charged is V.

According to the PTC device described above, when an overcharge occurs in the secondary battery, the voltage on the PTC device also exceeds the voltage V that occurs during charging of the secondary battery. In this case, the resistance value of the PTC device becomes $V^2/P$ or higher so that a thermal runaway occurs and the device heats up sharply. In this way, an overvoltage occurring in the secondary battery may be detected in the form of a thermal runaway of the PTC device.

Here, "thermally running away when the resistance becomes $V^2/P$ or higher" means that the thermal runaway starts as soon as the resistance value exceeds $V^2/P$ and does not include thermal runaway starting only after the resistance value has far exceeded $V^2/P$. In this aspect, it differs greatly from a PTC device in the prior art. In particular, if the PTC device is installed so that it is actuated through heat generated by the secondary battery when it is overcharged, an overvoltage may be detected more effectively.

According to the PTC device described above, the overvoltage occurring on the secondary battery may be detected in the form of a thermal runaway of the PTC device so that, for example, the charge circuit may be closed based on the temperature of the PTC device at this point. In this case, the occurrence of an overvoltage on the secondary battery during charging may be blocked so that failure or decreased performance thereof may be prevented.

The overvoltage protection device of the present invention is provided in a charge circuit for a secondary battery and cuts off the power supply route to the above secondary battery when an overvoltage occurs in the above secondary battery, and is characterized by being provided with the PTC device and an electrically conducting body which is connected both thermally and electrically to said PTC device and which cuts off the above power supply route when said PTC device reaches the thermal runaway temperature or higher.

According to the overvoltage protection device described above, if an overvoltage is applied on the secondary battery when it is being charged, the PTC device runs away thermally and heats up. The heat through heating up is thermally transmitted to and heats the electrically conducting body, which is connected thermally. Through this heating, the electrically conducting body detects that the PTC device is in a thermal runaway state and cuts off the power supply route. By this means, the charge circuit loses its resettability and goes into a so-called open mode.

According to this overvoltage protection device, the PTC device will detect an overvoltage occurring on the secondary battery during charging and the electrically conducting body will cut off the power supply route, so that the occurrence of an overvoltage on the secondary battery during charging may be blocked and failure or decreased performance thereof may be prevented.

The electronic apparatus of the present invention is provided with a battery storage section for storing a secondary battery and a charge circuit for supplying power to the above secondary battery, and is characterized by being provided with the overvoltage protection device.

According to the electronic apparatus described above, damage to the secondary battery through the application of an overvoltage may be prevented, so that failure of the secondary battery may be prevented. Through this, damage to the electronic apparatus caused by failure of the secondary battery may also be prevented.

BRIEF DESCRIPTION OF DRAWINGS

FIG. 2A is a plan view and FIG. 2B is a side view.

FIG. 4A is a plan view and FIG. 4B is a side view.

BEST MODE FOR CARRYING OUT THE INVENTION

Embodiments of the PTC device, the overvoltage protection device, and the electronic apparatus of this invention are explained below referencing the drawings. It goes without saying, however, that the invention is not limited in its interpretation to these embodiments.

The explanations on the embodiments are given using an example where the electronic apparatus of this invention is a battery pack for cellphones and the like. Needless to say, however, the application of this invention is not limited to cellphones, but may be used for digital cameras, video cameras, notebook computers, and other electronic apparatus.

Figure 1:
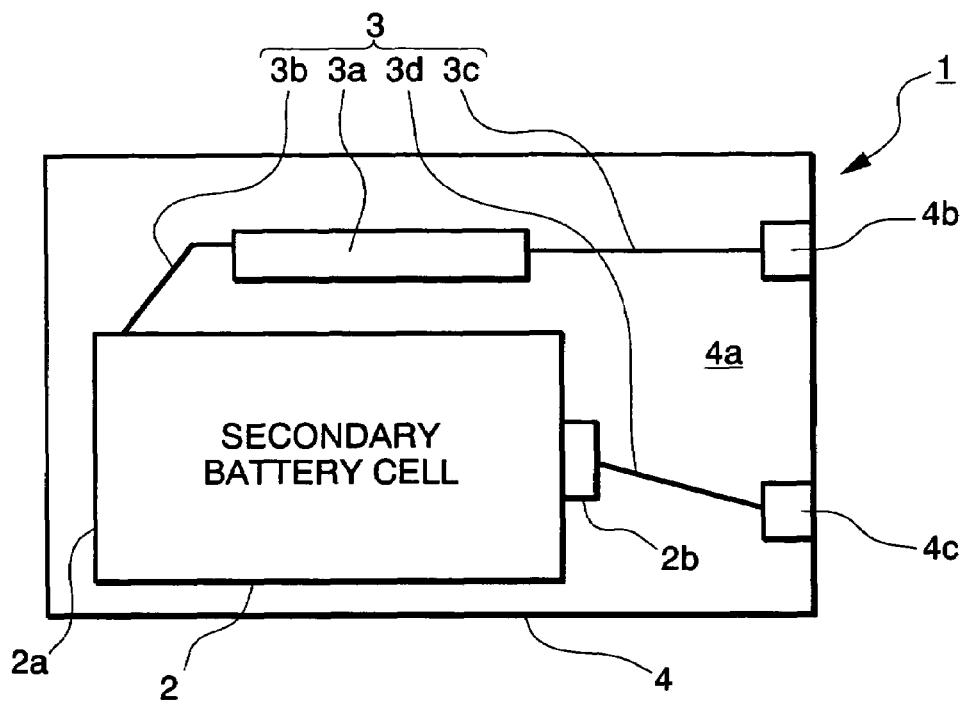
FIG. 1 is a schematic view showing the first embodiment of an electronic apparatus provided with the overvoltage protection device of this invention, explaining the inner construction of a battery pack.
Figure 2A:
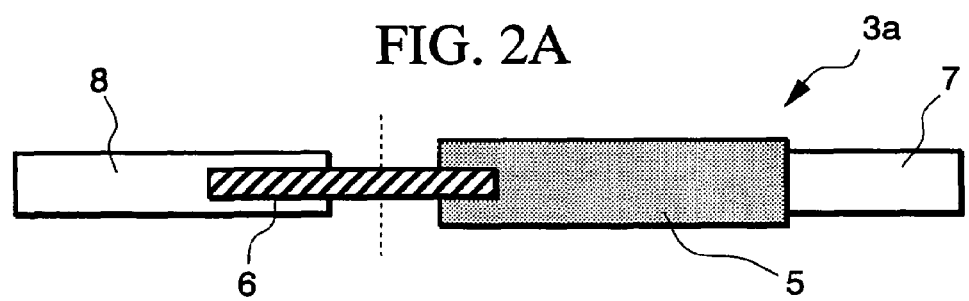
FIG. 2A and FIG. 2B are schematic views showing the overvoltage protection device.
Figure 2B:
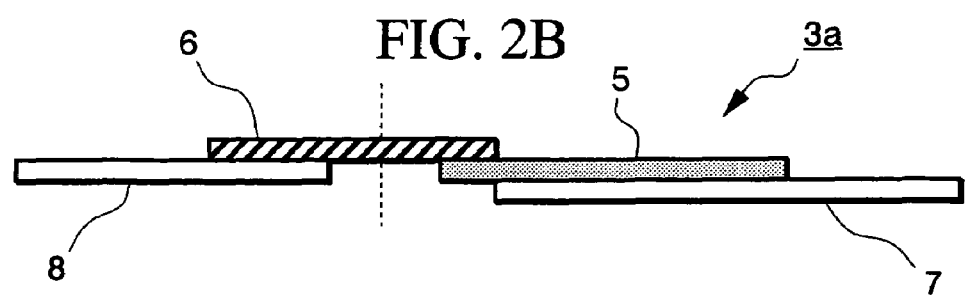
Figure 3:
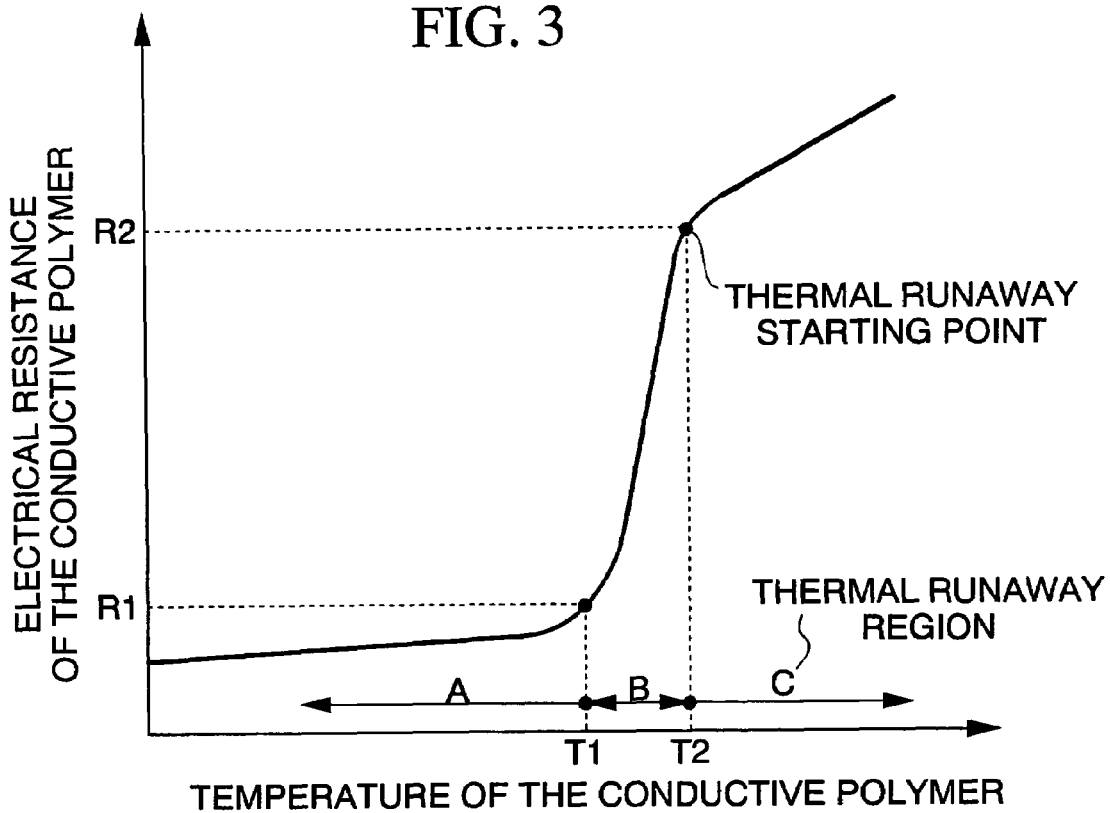
FIG. 3 is a graph chart showing the PTC characteristic of the conductive polymer provided in the overvoltage protection device, the horizontal axis showing the temperature of the conductive polymer and the vertical axis showing the electrical resistance of the conductive polymer.

A first embodiment of this invention is explained referencing FIG. 1 through FIG. 3.

As shown in FIG. 1, the battery pack (electronic apparatus) 1 in this embodiment comprises a secondary battery cell (secondary battery) 2, a charge circuit 3 that receives power externally and supplies it to the secondary battery 2, and a case 4 in which is formed a storage section 4a for storing these.

The secondary battery cell 2 above is a lithium ion secondary battery, in which a material containing manganese is applied as the positive electrode material and which is provided with a positive electrode 2a and a negative electrode 2b.

The charge circuit 3 above is provided with: an overvoltage protection device 3a, which cuts off the power supply route to the secondary battery cell 2 if an overvoltage occurs on the secondary battery cell 2; wiring 3b that connects this overvoltage protection device 3a and the positive electrode 2a above; wiring 3c that connects the overvoltage protection device 3a and an external negative terminal 4b described below; and wiring 3d that connects the negative electrode 2b and an external positive terminal 4c described below.

The above case 4 is a container comprising for example a resin molded part and is provided with an external negative terminal 4b and an external positive terminal 4c that input and output charge and discharge current to and from the electronic apparatus to which the case is attached.

As shown in FIG. 2A and FIG. 2B, the above overvoltage protection device 3a comprises a conductive polymer (PTC device) 5, a low melting point metal material (electrically conducting body) 6 connected directly to one end of the conductive polymer 5, a lead 7 connected directly to the other end, and another lead 8 connected directly to the low melting point metal material 6 side in such a way as to sandwich, together with the lead 7, the conductive polymer 5 and the low melting point metal material 6.

The conductive polymer 5 is a sheet-form member forming a rectangular shape when viewed flat and is a polymeric resin body obtained for example by radiation crosslinking a mixture which has kneaded together polyethylene and carbon black. Carbon black particles are present within this conductive polymer 5 linked to one another at room temperature, thereby forming numerous conductive paths through which current flows and exhibiting good conductivity. At the same time, it is provided with a characteristic wherein it expands thermally through a rise in the ambient temperature around it or through excessive current flowing in the conductive paths causing the distance between the carbon black particles to widen and cutting off the conductive paths, so that conductivity drops sharply (the electrical resistance increases). Metal foils are provided on the top and bottom surfaces of this conductive polymer 5 in order to reduce the electrical resistance in the bonded area between the lead 7 and between the low melting point metal material 6, but they have not been illustrated in the figures.

Thus, the conductive polymer 5 is provided with a PTC characteristic (positive temperature coefficient: PTC indicates an abbreviation thereof) whereby it changes its conductivity by thermally expanding. This PTC characteristic is explained using FIG. 3. As shown by the curve in the figure, the operating region of the conductive polymer 5 is divided broadly into three regions. That is, the first region A is a region wherein the conductive polymer 5 is not actuated by overcurrent or heat generation and is the normal use region when charging. The resistance of the conductive polymer 5 in this first region A is relatively low.

The second region B is a region wherein the electrical resistance of the conductive polymer 5 increases sharply through overcurrent or heat generation. For example, if a short occurs in the secondary battery 2 and an overcurrent flows, given that the power consumption when the conductive polymer 5 is actuated is P, the resistance is R, and the voltage is Vp (this voltage Vp is equal to the present voltage of the secondary battery cell 2), then $P=Vp^2/R$. This second region B is able to return (resettable) to a low resistance (the first region A) since an overvoltage is not applied. If an overvoltage is applied under an overcharge operation and the like, the region shifts to the third region C.

This third region C is what is called the thermal runaway region wherein the increase of the resistance R cannot catch up with the rise of the voltage Vp and the temperature of the conductive polymer 5 rises sharply to T2 or above. The actuating point at this temperature T2 is the thermal runaway starting point, and at that time the resistance value is R2. In lithium ion batteries in the prior art, only improvement of the voltage withstand characteristic was considered so that the resistance R2 was set at a high resistance value at the 1000 Ω level for example. This resistance value is far higher that the resistance value at the thermal runaway starting point.

In contrast, the conductive polymer 5 in this embodiment has the resistance value R2 at the thermal runaway starting point set so that it will run away thermally when the resistance value becomes $V^2/P$ or higher, given that the voltage when the secondary battery cell 2 is fully charged is V. Assuming use on a lithium ion secondary battery for example, and assuming the power consumption P to be 1 W and the voltage V when the secondary battery cell 2 is fully charged to be 4.2V, the resistance value R2 is at about the 16 Ω level, which is considerably lower than before. By adopting such a relatively low resistance value R2 as the thermal runaway starting point, overvoltage on the secondary battery cell 2 can be reliably detected before the cell fails.

A conductive polymer 5 having such a low resistance value for the thermal runaway starting point may be obtained by reducing the radiation dose when radiation crosslinking, or by adjusting the amount of carbon black to be added.

The abovementioned low melting point metal material 6 is a metal component formed in a rectangular shape and is connected both thermally and electrically to the conductive polymer 5. This low melting point metal material 6 is provided with a characteristic wherein it will fuse when heated to a prescribed temperature or above. In this embodiment, this prescribed temperature is matched to the temperature T2 at which the conductive polymer 5 has reached the thermal runaway starting point. The fusing position of the low melting point metal material 6 is for example the position shown by the dotted line in FIG. 2A and FIG. 2B. By fusing in two in this way, a physical (electrical) break is effected between the leads 7, 8, so that the charge circuit 3 is opened and the power supply route may be immediately cut off.

The above leads 7, 8 are connected to the abovementioned wiring 3b, 3c respectively. Thus, the negative electrode 2a of the secondary battery cell 2, wiring 3b, lead 8, low melting point metal material 6, conductive polymer 5, lead 7, and the external negative terminal 4b are electrically connected in that order.

The charging operation on a battery pack 1, which is provided with an overvoltage protection device 3a in this embodiment having a construction as described above, is explained below.

First, the battery pack 1 is attached to a charger to start charging. Or it may be attached directly to an electronic apparatus, which uses the battery pack 1 as the power source, and be charged via the electronic apparatus.

If an overvoltage occurs on the secondary battery cell 2 caused by malfunctioning of the charger or electronic apparatus, the secondary battery cell 2 generates heat and the conductive polymer 5 actuates from the heat generation (second region B). At this point, the voltage on the conductive polymer 5 exceeds the voltage V at full charge. In this case, since the conductive polymer 5 will have a resistance value of $V^2/P$ or higher, the actuating point exceeds the above thermal runaway starting point so that it enters the thermal runaway region (third region C) and the polymer gets up to a high temperature rapidly. The heat from the high temperature is thermally transmitted to the low melting point metal material 6 to heat it up. Because this heating causes the temperature to reach T2 or above, the low melting point metal material 6 detects that the conductive polymer 5 is in a thermal runaway state and fuses itself to cut off the power supply route. Through this, further supply of charge current to the secondary battery cell 2 is stopped. In this way, an unresettable, so-called open mode charge circuit is provided when there is an overcharged caused by an overvoltage.

In contrast, if the voltage applied when the conductive polymer 5 is actuated is equal to or less than the voltage V at full charge, the polymer functions as a resettable overcurrent/overvoltage protection device.

As explained above, according to the battery pack 1 provided with the overvoltage protection device 3a, the conductive polymer 5 will detect an overvoltage if it occurs on the secondary battery cell 2 during charging and the low melting point metal material 6 will cut off the power supply route, so that the occurrence of an overvoltage on the secondary battery cell 2 during charging is reliably blocked and failure or decreased performance thereof may be prevented.

Figure 4A:
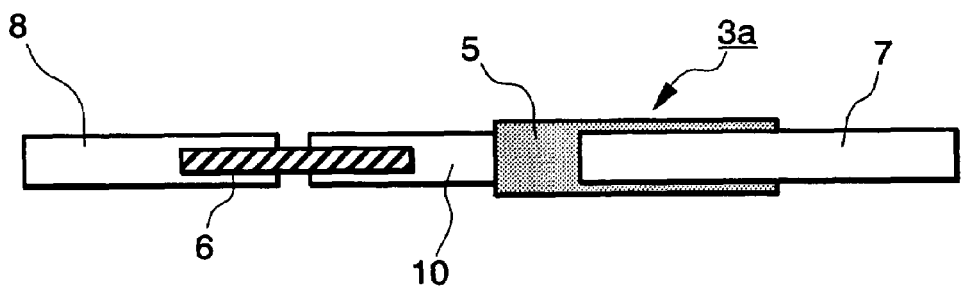
FIG. 4A and FIG. 4B are schematic views showing the second embodiment of the overcurrent protection device of this invention.
Figure 4B:
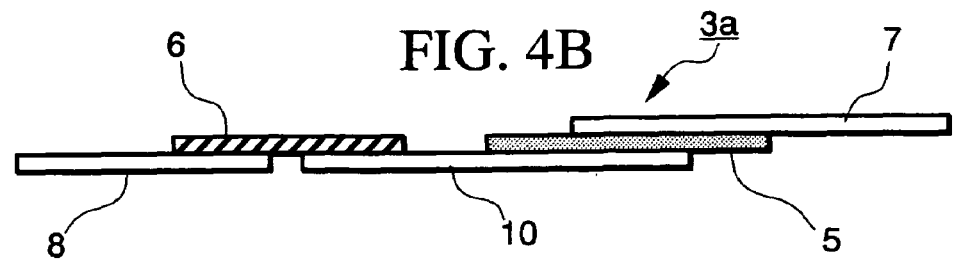

Next, a second embodiment of this invention is explained using FIG. 4A and FIG. 4B. The explanation in this embodiment will focus on differences with the first embodiment described above; on other points the same elements will be used and their explanations omitted as being the same as the above first embodiment.

As shown in FIG. 4A and FIG. 4B, the overvoltage protection device 3a in this embodiment does not have a direct connection in the connection between the conductive polymer 5 and the low melting point metal material 6, but has a connection via a lead 10 made of nickel or copper. That is, the low melting point metal material 6 is connected to one end of the lead 10 while the conductive polymer 5 is connected to the other end. As with the above first embodiment, the lead 10 connects the conductive polymer 5 and the low melting point metal material 6 both electrically and thermally.

In this embodiment also, it is possible to obtain the same effect as the above first embodiment. In addition, the overvoltage protection device 3a in this embodiment may secure higher strength structurally, since the connection strength between the conductive polymer 5 and the low melting point metal material 6 has been reinforced by the lead 10.

In both of the above embodiments, the overvoltage protection device 3a has been attached to the battery pack 1 to be charged; however, it need not be limited to this and the device may be provided on the charger or the electronic apparatus charging the battery pack 1.

Also in both of the above embodiments, explanations were given using as example a case where the electrically conducting body that detects the heat of the conductive polymer 5 and cuts off the power supply route is a low melting point metal material 6, but other parts such as a thermistor switch and the like may be adopted as long as they can cut off the power supply route.

According to the PTC device of the present invention, the overvoltage occurring on the secondary battery may be detected in the form of a thermal runaway of the PTC device so that, for example, the charge circuit may be closed based on the temperature of the PTC device at this point. In this case, the occurrence of an overvoltage on the secondary battery during charging may be blocked so that failure or decreased performance thereof may be prevented.

The invention claimed is:

1. A PTC device provided in a charge circuit for a secondary battery, characterized by the PTC device thermally running away when the resistance of the PTC device becomes $V^2/P$ or higher, given the power consumption of the PTC device when the PTC device is actuated is P and the voltage of the secondary battery in the charge circuit at which the secondary battery is fully charged is V.

2. An overvoltage protection device, which is provided in a charge circuit for a secondary battery and which cuts off the power supply route to the secondary battery when an overvoltage occurs in the secondary battery, characterized by being provided with a PTC device according to claim 1 and an electrically conducting body which is connected both thermally and electrically to said PTC device and which cuts off the power supply route when said PTC device reaches the thermal runaway temperature of the PTC device or higher.

3. An electronic apparatus, which is provided with a battery storage section for storing a secondary battery and a charge circuit for supplying power to the secondary battery, characterized by being provided with an overvoltage protection device according to claim 2.

* * * * *